United States Patent [19]

Bannon

[11] 4,274,944
[45] Jun. 23, 1981

[54] FRACTIONATION PROCESS

[75] Inventor: Robert P. Bannon, Houston, Tex.

[73] Assignee: Shell Oil Company, Houston, Tex.

[21] Appl. No.: 106,340

[22] Filed: Dec. 21, 1979

[51] Int. Cl.³ .......................... B01D 3/06; C10G 7/00
[52] U.S. Cl. ..................................... 208/352; 208/355
[58] Field of Search ........................ 208/355, 352, 361

[56] References Cited

U.S. PATENT DOCUMENTS

| 2,736,688 | 2/1956 | Kraft | 208/355 |
| 2,952,631 | 9/1960 | Hausch | 208/355 |
| 3,310,487 | 3/1967 | Johnson et al. | 208/355 |
| 3,402,124 | 9/1968 | Jones | 208/355 |
| 4,003,822 | 1/1977 | Jo | 208/355 |

Primary Examiner—T. M. Tufariello

[57] ABSTRACT

An improved two column crude oil fractional distillation process, characterized by transfer of top product from the second column to specified locations in the first column, is disclosed.

2 Claims, 3 Drawing Figures

FRACTIONATION PROCESS

BACKGROUND OF THE INVENTION

The invention relates to an improved crude oil fractional distillation process. In particular, the invention relates to a method of crude oil fractional distillation characterized by improved energy efficiency.

Although modern crude oil distillation units are usually one column units, many two column units are still in use. However, the typical two column unit has two large disadvantages: (1) lower potential for heat recovery, and (2) poor fractionation between the two lightest fractions, i.e., the top products from the two columns. The invention overcomes both of these disadvantages.

SUMMARY OF THE INVENTION

Accordingly, the invention in one embodiment is a process for fractionating crude oil which comprises:

(a) passing a crude oil feed stream into the flasher section of a first fractional distillation column, the fractional distillation column comprising said flasher section and a segregated naphtha splitter section, under conditions in said flasher section effective to fractionate said crude oil feed stream into a rectified vapor and a flashed crude bottoms;

(b) passing rectified vapor to an intermediate location in the naphtha splitter section and fractionally distilling said vapor under conditions effective to produce a light naphtha fraction, a heavy naphtha fraction, and a reflux liquid which is returned to the flasher section;

(c) passing the flashed crude bottoms to a second fractional distillation column and fractionally distilling said flashed crude bottoms to produce a product mix comprising a naphtha fraction, a gas oil, and residue; and (d) passing at least the bulk of said naphtha fraction to said flasher section of said first fractional distillation column.

In another embodiment of the invention, the naphtha fraction from the second fractional distillation column is passed to the naphtha splitter section.

In yet another embodiment of the invention, the primary fractional distillation column is operated to provide functionally a flasher section and a light naphtha rectification section, as follows. The crude oil is flashed in the flasher section of the primary column to produce a flashed crude bottom, which is passed to a second fractional distillation column, and a flashed vapor. The flashed vapor is rectified, and a liquid fraction is withdrawn from an intermediate location of the rectification section, and is passed to the upper portion of a stripper column and fractionated to produce a heavy naphtha fraction and an overhead fraction which is returned to the rectification section. The naphtha fraction (top product) from the second fractional distillation column is passed to an intermediate location in the primary column, and light naphtha is recovered overhead. Accordingly, in this embodiment, the invention is a process for fractionating crude oil which comprises:

(a) passing a crude oil feed stream into the flasher section of a first fractional distillation column and producing a flashed crude bottoms, which is sent to a second fractional distillation column, and a flashed vapor, and rectifying said vapor in a rectification section of said first fractional distillation column;

(b) withdrawing rectified liquid from an intermediate location in the rectification section of said first fractional distillation column and fractionally distilling said liquid to produce an overhead vapor fraction and a heavy naphtha fraction, and passing said overhead vapor fraction to said rectification section of said first fractional distillation column;

(c) fractionally distilling the flashed crude bottoms in said second fractional distillation column to produce a product mix comprising a naphtha fraction, a gas oil, and residue;

(d) passing at least the bulk of said naphtha fraction to an intermediate location in said first fractional distillation column, and (e) recovering a light naphtha fraction as overhead from said first fractional distillation column.

DETAILED DESCRIPTION OF THE INVENTION

In order to describe the invention with greater particularity, reference is made to the accompanying drawing.

Figure 1:
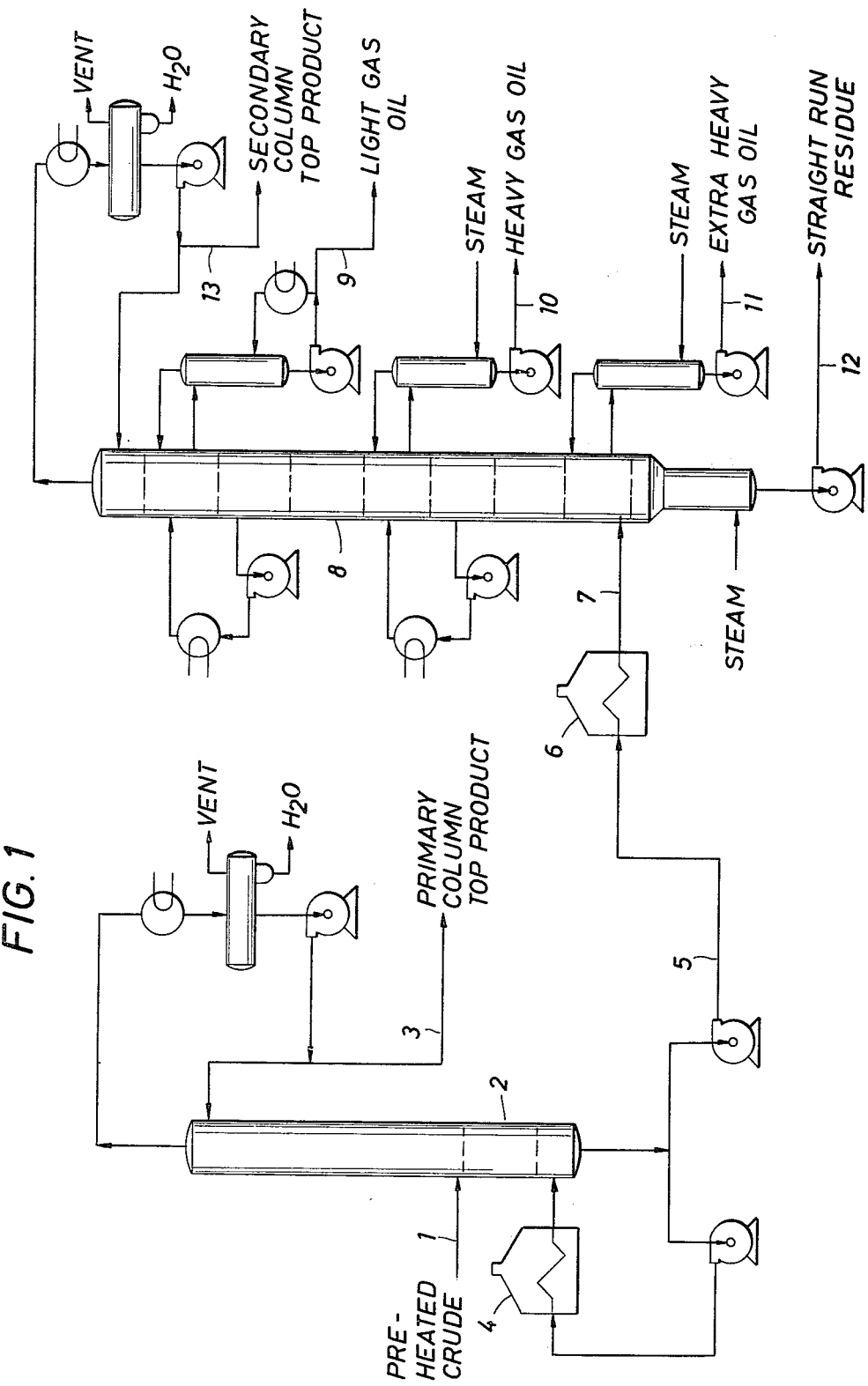

FIG. 1 illustrates conventional two column fractional distillation practice. Preheated crude in line 1 enters primary column 2, preferably at a point 10 to 15 trays above the bottom of the column.

Typically, primary column 2 is a simple distillation column with only one feed and two products. The top product in line 3 is a light naphtha which contains essentially all of the butane and lighter components in the crude plus a substantial fraction of the components boiling up to 250°–300° F. The primary column is reboiled with fired heater 4. Primary column bottoms are fed via line 5 directly to secondary column feed heater 6, and thence, via line 7 to secondary column 8.

Secondary column 8 is a complex column with several side product withdrawals and circulating reflux streams. Lines 9, 10, 11 and 12 indicate respectively, light gas oil, heavy gas oil, extra heavy oil, and straight run residue product streams. The top product from secondary column 8 in line 13 is essentially a full-range naphtha. It is similar in composition to the primary column top product except that it contains very little butane and lighter components and almost all of the higher boiling (300°–400° F.) naphtha components in the crude.

Figure 2:
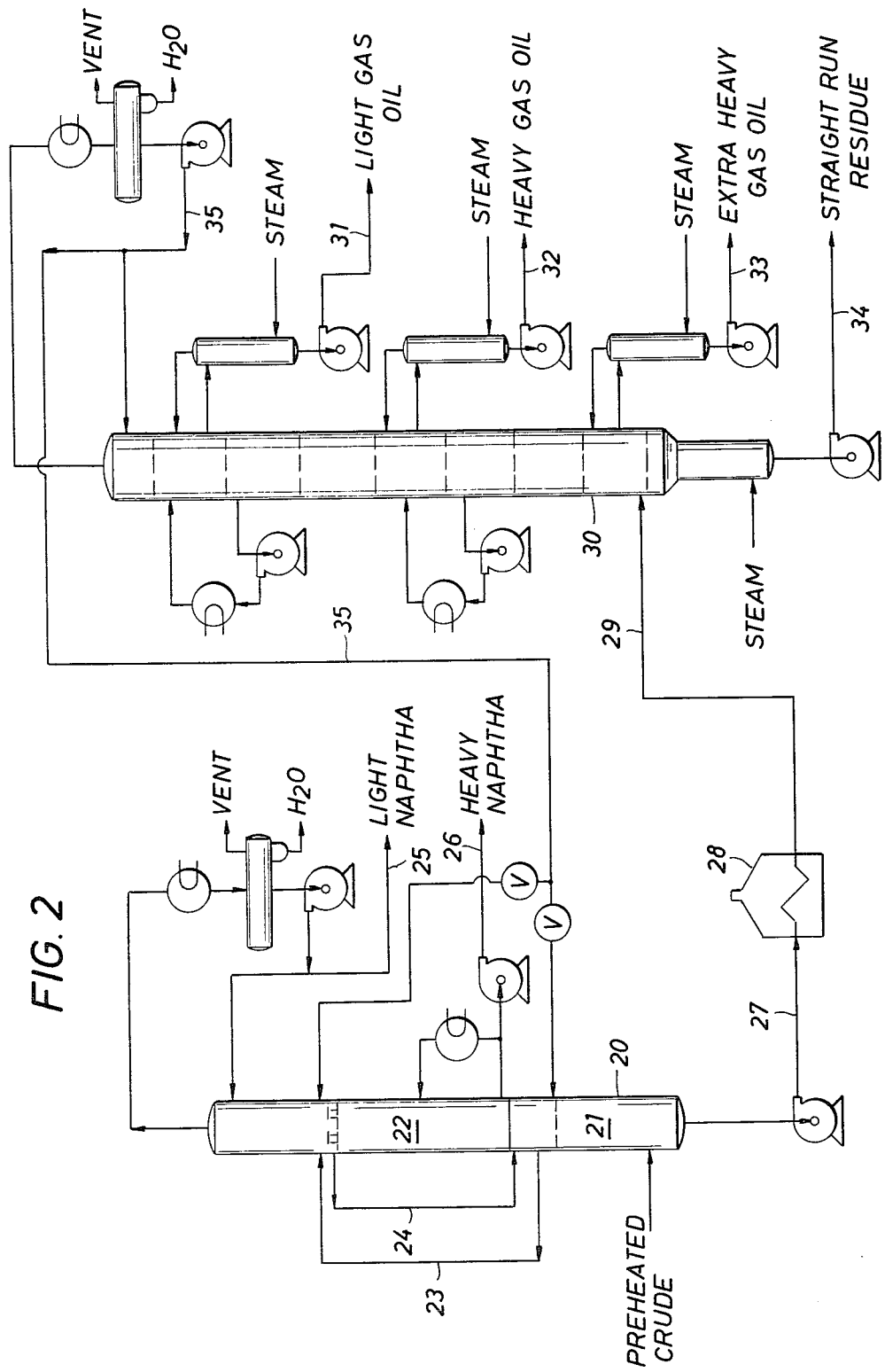

FIG. 2 illustrates the approach taken in the improved process of the invention. Primary column 20 is divided into two segregated sections with restricted vapor and liquid communication, crude flash section 21 and a naphtha splitter section 22. Crude flash section 21 is located in the lower portion of column 20, and may be provided with multiple rectifying trays, e.g., 12 trays. Naphtha splitter section 22 is located in the upper portion of column 20, and is separated from section 21 by a barrier. Vapor communication between sections 21 and 22 is achieved by sidedraw line 23. Reflux is obtained by return of liquid from the upper portion of section 22 via line 24.

Naphtha splitter section 22 is a fractional distillation section having at least two product withdrawal streams. As shown, a light naphtha is withdrawn via line 25, and a heavy naphtha via line 26. Flashed crude from the bottom of column 20 is fed via line 27 to heat exchange zone 28 wherein heat is supplied for further distillation. From unit 28, the bottom liquid proceeds via line 29 to fractional distillation column 30 where the bottom liquid is fractionally distilled as desired. Operation of column 30 is similar to that of column 8 (FIG. 1), lines 31 through 34 indicating, respectively, light gas oil, heavy gas oil, extra heavy gas oil, and straight run residue streams. These product distributions are exemplary, and may be varied, as desired. However, a critical difference over the operation of column 8 is the transfer of the top product of column 30, (or at least the bulk thereof), a full range naphtha, via line 35 to column 20. The top product in line 35 is preferably introduced (as shown) into section 21 near the upper portion thereof, and provides reflux therefor. This approach has the real advantage that if the naphtha fraction from the secondary column contains high boiling components unwanted in the heavy naphtha product, additional separation is attainable.

In operation, a preheated crude is fed to flash section 21 of column 20 wherein the lighter components flash off. Flash vapor is rectified, preferably in an 8 to 10 tray zone which is refluxed with secondary column top product in line 35 from column 30 and/or liquid from naphtha splitter section 22. Rectified vapor is fed via line 23 to an intermediate location in section 22. Section 22 is operated under conditions to fractionate the vapor into a light naphtha and heavy naphtha product. A small reboiler is provided, as shown, to provide stripping vapor for the lower trays of the naphtha splitter section.

As indicated, the naphtha fraction from column 30 (or at least the bulk thereof) may be returned to naphtha splitter section 22. This approach is useful if the volume of liquid from secondary column 30 is more than necessary to provide reflux for section 21. The flows to sections 21 and 22 may be apportioned, if desired, to provide optimum results.

Figure 3:
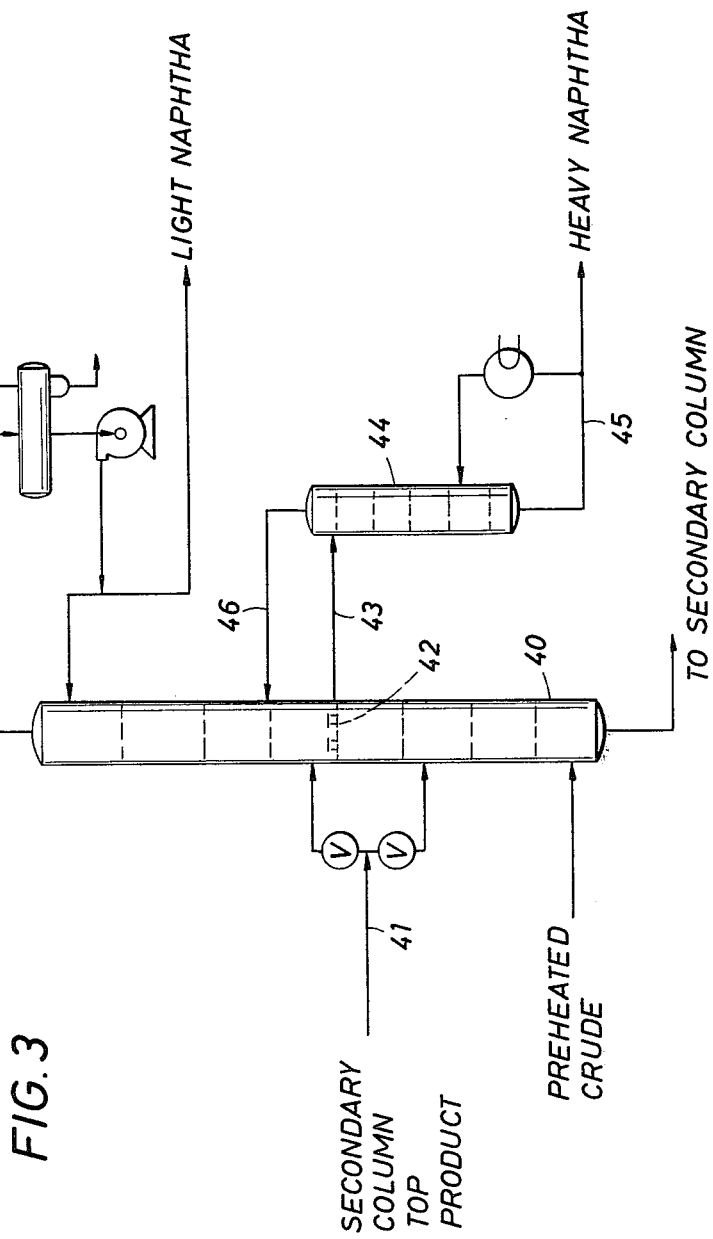

FIG. 3 illustrates another embodiment of the invention. In this embodiment, preheated crude is fed into the bottom or lower portion of primary fractionating column 40 where it is flashed to provide a vapor for rectification and a flashed bottoms fraction which is sent to a second fractional distillation column, e.g., column 30. Vapor is rectified, as previously described, and the top product from the second fractional distillation column is returned to the intermediate section of primary column 40 via line 41 (comparable to line 35). Preferably, line 41 is split before entry into the column, a portion providing reflux to the lower section of column 40. A draw off tray 42 is provided for transfer of liquid via line 43 to a stripper column 44. In column 44 the liquid is further rectified to provide a heavy naphtha bottoms product in line 45 and a light overhead vapor in line 46. The overhead in line 46 is returned to column 40, wherein it is rectified to provide an overhead light naphtha product, (line 47) as shown. In this embodiment, there is vapor-liquid communication between the top and bottom of column 40, stripper column 44 functioning to provide the separation of the previous embodiments.

The invention has significant advantages. First, the separation between light and heavy naphtha (primary column and secondary column top products in the typical illustrated process) is vastly improved and the cut-point is easily adjusted. Because (in the invention) the top product of the second or secondary column is processed in the first or primary column, as shown, the top product may contain increased amounts of pentanes and hexanes and lesser amounts of higher boiling components (depending on cut point) when compared with the typical two column unit illustrated. The importance of this depends on downstream processing, but this may eliminate a downstream fractionation. The potential for energy conservation, i.e., crude preheating by crude/hot stream heat exchange, is greater because the rise in crude temperature across the primary column has been eliminated. Moreover, only one fired heater is required for the process of the invention instead of two for the typical illustrated process.

Total distillate yield (calculated) at equivalent secondary column flash zone conditions is slightly higher for the process of the invention compared to the typical two-column process illustrated. The process of the invention has a significantly higher total distillate yield (calculated) than a modern one-column unit at the same flash zone temperature because the secondary column of the process of the invention can operate at a significantly lower pressure than the crude column of the one-column unit. Finally, in the process of the invention, the formation of a separate liquid water phase within the column can be easily avoided. In one-column units processing medium or heavier gravity crude and splitting naphtha in the crude column, it is difficult to avoid the formation of a second water phase. A separate water phase is corrosive and often causes operating problems.

While the invention has been illustrated with respect to particular apparatus, those skilled in the art will appreciate that other equivalent or analogous structures may be employed. For example, packed columns may be utilized instead of the tray columns illustrated. Again, all pumps, valves, entry and exit lines, etc., have not been illustrated, as such expedients can readily be supplied by the skill of the art.

What is claimed is:

1. A process for fractionating crude oil which comprises:
   (a) passing a crude oil feed stream into the flasher section of a first fractional distillation column, the fractional distillation column comprising said flasher section and a segregated naphtha splitter section, under conditions in said flasher section effective to fractionate said crude oil feed stream into a rectified vapor and a flashed crude bottoms;
   (b) passing rectified vapor from the flasher section to an intermediate location in the naphtha splitter section and fractionally distilling said vapor under conditions effective to produce a light naphtha fraction, a heavy naphtha fraction, and a reflux liquid which is returned to the flasher section;
   (c) passing the flashed crude bottoms to a second fractional distillation column and fractionally distilling said flashed crude bottoms to produce a product mix comprising a naphtha fraction, a gas oil, and residue; and
   (d) passing at least the bulk of said naphtha fraction to said flasher section of said first fractional distillation column.

2. A process for fractionating crude oil which comprises:
   (a) passing a crude oil feed stream into the flasher section of a first fractional distillation column, the fractional distillation column comprising said flasher section and a segregated naphtha splitter section, under conditions in said flasher section effective to fractionate said crude oil feed stream into a rectified vapor and a flashed crude bottoms;
   (b) passing a rectified vapor to an intermediate location in the naphtha splitter section and fractionally distilling said vapor under conditions effective to produce a light naphtha fraction, a heavy naphtha fraction, and a reflux liquid which is returned to the flasher section;

(c) passing the flashed crude bottoms to a second fractional distillation column and fractionally distilling said flashed crude bottoms to produce a product mix comprising a naphtha fraction, a gas oil, and residue; and (d) passing at least the bulk of said naphtha fraction to the naphtha splitter section of said first fractional distillation column.

* * * * *